(12) United States Patent
Stefani et al.

(10) Patent No.: US 7,149,612 B2
(45) Date of Patent: Dec. 12, 2006

(54) SYSTEM AND METHOD FOR MONITORING AND REPORTING AIRCRAFT QUICK ACCESS RECORDER DATA

(75) Inventors: Rolf Stefani, West River, MD (US); Alexander Scherbina, Annapolis, MD (US)

(73) Assignee: Arinc Incorporated, Annapolis, MD (US)

( * ) Notice: Subject to any disclaimer, the term of this patent is extended or adjusted under 35 U.S.C. 154(b) by 156 days.

(21) Appl. No.: 10/750,868

(22) Filed: Jan. 5, 2004

(65) Prior Publication Data
US 2005/0149238 A1 Jul. 7, 2005

(51) Int. Cl.
G01M 15/00 (2006.01)
(52) U.S. Cl. .................... 701/35; 701/29; 701/33; 702/184; 714/799
(58) Field of Classification Search ................. 701/29, 701/33, 35, 14, 36, 213, 3, 10, 7–8; 340/425.5, 340/438; 706/47, 59, 61; 702/184; 714/798–799; G01M 17/00; G06F 17/00; G06N 7/00, G06N 7/08
See application file for complete search history.

(56) References Cited

U.S. PATENT DOCUMENTS

| | | | |
|---|---|---|---|
| 4,207,611 A * | 6/1980 | Gordon | 701/33 |
| 4,251,688 A * | 2/1981 | Furner | 381/18 |
| 4,675,675 A | 6/1987 | Corwin et al. | |
| 4,729,102 A | 3/1988 | Miller, Jr. et al. | |
| 4,788,531 A | 11/1988 | Corwin et al. | |
| 4,943,919 A | 7/1990 | Aslin et al. | |
| 5,019,980 A | 5/1991 | Starr et al. | |
| 5,442,553 A | 8/1995 | Parrillo | |
| 5,528,499 A * | 6/1996 | Hagenbuch | 701/50 |
| 5,552,984 A | 9/1996 | Crandall et al. | |
| 5,566,092 A * | 10/1996 | Wang et al. | 702/185 |
| 5,631,832 A * | 5/1997 | Hagenbuch | 701/35 |
| 5,650,930 A * | 7/1997 | Hagenbuch | 701/50 |
| 5,742,914 A * | 4/1998 | Hagenbuch | 701/35 |
| 5,890,079 A | 3/1999 | Levine | |
| 5,931,877 A | 8/1999 | Smith et al. | |
| 5,974,349 A | 10/1999 | Levine | |
| 6,009,356 A | 12/1999 | Monroe | |
| 6,047,165 A | 4/2000 | Wright et al. | |
| 6,092,008 A | 7/2000 | Bateman | |
| 6,115,656 A * | 9/2000 | Sudolsky | 701/35 |

(Continued)

FOREIGN PATENT DOCUMENTS

US    EP1455313    *  9/2004

OTHER PUBLICATIONS

Nelson et al., A model-based approach to informnation fusion, Defense Science and Technology Organization, from Proceeding of information, decision, and control, 1999, pp. 395-400.*

(Continued)

*Primary Examiner*—Cuong Nguyen
(74) *Attorney, Agent, or Firm*—Oliff & Berridge, PLC

(57) ABSTRACT

Systems and methods for monitoring and reporting a quick access recorder (QAR) data in real time. The system includes a QAR for recording fault information, a removable portable hardware component that stores, analyzes and displays the fault information, an onboard data communication network that enables the QAR and the portable hardware component to exchange information, and an air-ground data transmitting device for transmitting the fault information from the vehicle. The removable portable hardware component may be an Electronic Flight Bag (EFB) that hosts a QAR Manager application and communication technologies to manage and report all applications on the EFB.

19 Claims, 5 Drawing Sheets

U.S. PATENT DOCUMENTS

| | | | |
|---|---|---|---|
| 6,173,230 B1 | 1/2001 | Camus et al. | |
| 6,216,066 B1 | 4/2001 | Goebel et al. | |
| 6,219,597 B1* | 4/2001 | Longere | 701/29 |
| 6,263,265 B1 | 7/2001 | Fera | |
| 6,308,045 B1 | 10/2001 | Wright et al. | |
| 6,339,736 B1* | 1/2002 | Moskowitz et al. | 701/29 |
| 6,353,734 B1 | 3/2002 | Wright et al. | |
| 6,353,779 B1 | 3/2002 | Simon et al. | |
| 6,397,128 B1 | 5/2002 | Todd | |
| 6,434,512 B1* | 8/2002 | Discenzo | 702/184 |
| 6,480,765 B1 | 11/2002 | Gardner | |
| 6,526,337 B1 | 2/2003 | Gardner | |
| 6,546,785 B1* | 4/2003 | Discenzo | 73/53.05 |
| 6,594,524 B1* | 7/2003 | Esteller et al. | 607/45 |
| 6,633,800 B1* | 10/2003 | Ward et al. | 701/2 |
| 6,701,231 B1* | 3/2004 | Borugian | 701/30 |
| 6,718,235 B1* | 4/2004 | Borugian | 701/1 |
| 6,725,137 B1* | 4/2004 | Eagleton et al. | 701/29 |
| 6,735,630 B1* | 5/2004 | Gelvin et al. | 709/224 |
| 6,738,697 B1* | 5/2004 | Breed | |
| 6,745,010 B1* | 6/2004 | Wright et al. | 455/66.1 |
| 6,757,668 B1* | 6/2004 | Goebel et al. | 706/59 |
| 6,816,760 B1* | 11/2004 | Namaky | 701/29 |
| 6,826,607 B1* | 11/2004 | Gelvin et al. | 709/224 |
| 6,832,251 B1* | 12/2004 | Gelvin et al. | 709/224 |
| 6,850,824 B1* | 2/2005 | Breed | 701/36 |
| 6,859,831 B1* | 2/2005 | Gelvin et al. | 709/224 |
| 7,020,701 B1* | 3/2006 | Gelvin et al. | 709/224 |
| 2002/0007234 A1 | 1/2002 | Heppe et al. | |
| 2002/0103512 A1* | 8/2002 | Echauz et al. | 607/9 |
| 2002/0111720 A1 | 8/2002 | Holst et al. | |
| 2003/0003872 A1 | 1/2003 | Brinkley et al. | |
| 2003/0065428 A1 | 4/2003 | Mendelson et al. | |
| 2003/0069015 A1 | 4/2003 | Brinkley et al. | |
| 2003/0083794 A1 | 5/2003 | Halm et al. | |
| 2003/0158587 A1* | 8/2003 | Esteller et al. | 607/45 |
| 2003/0191563 A1* | 10/2003 | Eagleton et al. | 701/29 |
| 2004/0160340 A1* | 8/2004 | Thomson et al. | |
| 2004/0230352 A1* | 11/2004 | Monroe | |
| 2005/0149238 A1* | 7/2005 | Stefani et al. | 701/33 |

OTHER PUBLICATIONS

Jeon et al., Decision fusion approach for multitemporal classification, IEEE Trans. on Geoscience & Remote sensing, vol. 37 No. 3, pp. 1227-1233, May 1999.*

Becky Castano, On-board traverse science data analysis, NASA Jet Propulsion Laboratory, NASA SISM Intelligent Systems Project Automated Reasoning Research Record, Nov. 29, 2004.*

ARINC wins NASA Contract Extension for Aircraft Health Management System, ARINC News, Sep. 24, 2002, p. 1.*

Aircraft Condition Analysis and Management System (ACAMS), ARINC Products & Services, Oct. 15, 2002, p. 1.*

Kacprzynski et al., Assessment of data and knowledge fusion strategies for prognostics and health management, IEEE, 2001, p. 6-2979 to 6-2988.*

Nwadiogbu et al., Development of diagnostic and prognostic system for engine health and usage management, p. 185-192.*

* cited by examiner

SYSTEM AND METHOD FOR MONITORING AND REPORTING AIRCRAFT QUICK ACCESS RECORDER DATA

BACKGROUND OF THE INVENTION

1. Field of Invention

This invention relates to systems and methods for monitoring, analyzing and reporting a vehicle, such as, for example, aircraft, data.

2. Description of Related Art

The use of computers has expanded the scope of maintenance-related monitoring and reporting of vehicle data, such as, for example, aircraft data, especially the reporting of malfunction or fault information. Fault information may be used to determine which vehicle systems and components require further testing and/or observation by, for example, flight crew or maintenance personnel; and/or replacement or repair. Fault information generally is based on the crews' observations and maintenance personnel analysis, using maintenance manuals and operator initiated testing. However, because fault information determinations are highly dependent upon crew member observation, crew member memory and crew member analysis, these are relatively inefficient and unreliable.

To facilitate the maintenance of an aircraft, most aircraft systems now are made up in part of components that can be removed and replaced quickly. These components are called Line Replaceable Units (LRUs). An LRU is a highly complex module often incorporating several data processors for controlling and/or monitoring one or more components or systems of an aircraft. An LRU may be provided to monitor and/or control one or more devices such as an actuator, valve, motor, pump, etc., associated with a particular component or assembly of a vehicle, such as, for example, an aircraft. An LRU identifies faults during operation in flight, and requires the integration of multiple fault data to independently report the fault source, i.e., a specific component or assembly. An LRU typically also generates output signals which are monitored to determine if the component is not operating properly.

As the number of aircraft systems that make use of LRUs has increased and as aircraft systems have become more complex, so has the volume of maintenance information. The volume of information makes it difficult for the flight crews and ground crews to obtain the specific information they need to analyze and diagnose causes of identified faults. Thus, a system to collect and consolidate the voluminous fault information is needed. One such system is based on a centralized scheme for fault data collection and analysis. In that system, the LRUs are recorded on a Quick Access Recorder (QAR). The QAR records the information from the multiple LRUs and other components which are monitored, and stores the monitored information on a medium, such as, for example, a high density optical storage disc. In that system, the LRU data from multiple LRUs is automatically collected during flight or at the end of the flight, and analyzed by the maintenance personnel to determine repair of faulty component(s), if needed.

An example of a system that utilizes a QAR can be found in U.S. Pat. No. 6,115,656 to Sudolsky, the subject matter of which is incorporated herein in its entirety. The system in Sudolsky records and reports fault information pertaining to various components of an aircraft. The method of Sudolsky involves recording a large, diverse amount of information output from various LRUs and other components of the aircraft during takeoff, flight, and landing through the use of a bulk storage device, such as an optical quick access recorder (QAR), onto an electronic data storage medium, specifically an optical storage disk. The optical storage disk is then removed from the aircraft after landing and the information read by an appropriate apparatus. Based on this information, maintenance personnel attempt to determine whether or not a fault indication recorded during flight is a legitimate fault requiring the affected LRU to be removed from the aircraft for further diagnostic testing. Although, this method reduces the incidence of no-fault diagnostic test results, and saves man hours which would otherwise be spent testing LRUs and other components which are in fact operating properly, this method uses expensive, proprietary equipment that is permanently installed on the aircraft, and which requires extensive certification processes by a maintenance crew. Further, this system requires a highly-skilled maintenance crew to board the aircraft after the flight and download the recorded LRU fault information.

SUMMARY OF THE INVENTION

Accordingly, the present invention provides systems and methods for monitoring and reporting a vehicle's (e.g., an aircraft's) quick access recorder (QAR) data based on a removable and portable hardware component.

This invention separately provides systems and methods that monitor and report QAR's fault information in real-time.

One exemplary embodiment according to the systems and methods of this invention performs real-time monitoring and analysis of the QAR data received from a QAR device for specific QAR events.

Other exemplary embodiments of the systems and methods of this invention separately utilize an air-ground data transmitting device to transmit notification messages to the ground when the fault indication events occur.

Other exemplary embodiments of the systems and methods of this invention separately advise the users (e.g., pilots and/or maintenance crew) of notable fault indication events.

Other exemplary embodiments of the systems and methods of this invention separately monitor any number of QAR events that include a number of vehicle parameters and conditions.

Other exemplary embodiments of the systems and methods of this invention separately provide for notification of vehicle, such as, for example, an aircraft, complex system fault behavior to a ground crew for corrective action.

Other exemplary embodiments of the systems and methods of this invention provide for interfacing with flight crew or adaptive flight control systems for in-flight corrective action of aircraft complex systems.

Other exemplary embodiments of the systems and methods according to this invention provide a QAR device, an air-ground data transmitting device, an onboard data communication network, and a hardware component.

Other exemplary embodiments of the systems and methods according to this invention provide a hardware component that is removable from the vehicle and is portable.

In other exemplary embodiments of the systems and methods according to this invention, the removable and portable hardware component is a PC-based host that operates a QAR Manager application.

In other exemplary embodiments of the systems and methods according to this invention, the removable and portable hardware component is an Electronic Flight Bag (EFB).

In other exemplary embodiments of the systems and methods according to this invention, the EFB hosts a QAR Manager application.

In various exemplary embodiments of the systems and methods of the invention, the QAR Manager is a program, such as, for example, eFlightDeck, that uses the EFB and communication technologies to manage applications on the EFB.

In other exemplary embodiments of the systems and methods according to this invention, the air-ground data transmitting device is connected to an air-ground antenna, wherein the air-ground data transmitting device is capable of operating independently of the aircraft's main power.

In other exemplary embodiments of the systems and methods of this invention, the air-ground data transmitting device is connected to the main power source of the vehicle, such as, for example, aircraft.

In other further exemplary embodiments of the systems and methods of this invention, the system will also monitor, in real time, operational performance parameters of the attached QAR in order to display actual status of QAR hardware, including memory allocation and free space availability for recorded data as well as other statistical data such as when data was last off-loaded.

These and other features and advantages are described in, or are apparent from, the following detailed description of various exemplary embodiments of the systems and methods according to this invention.

BRIEF DESCRIPTION OF THE DRAWINGS

Various exemplary embodiments of the systems and methods according to this invention will be described in detail with reference to the following figures, wherein.

DETAILED DESCRIPTION OF PREFERRED EMBODIMENTS

Figure 1:
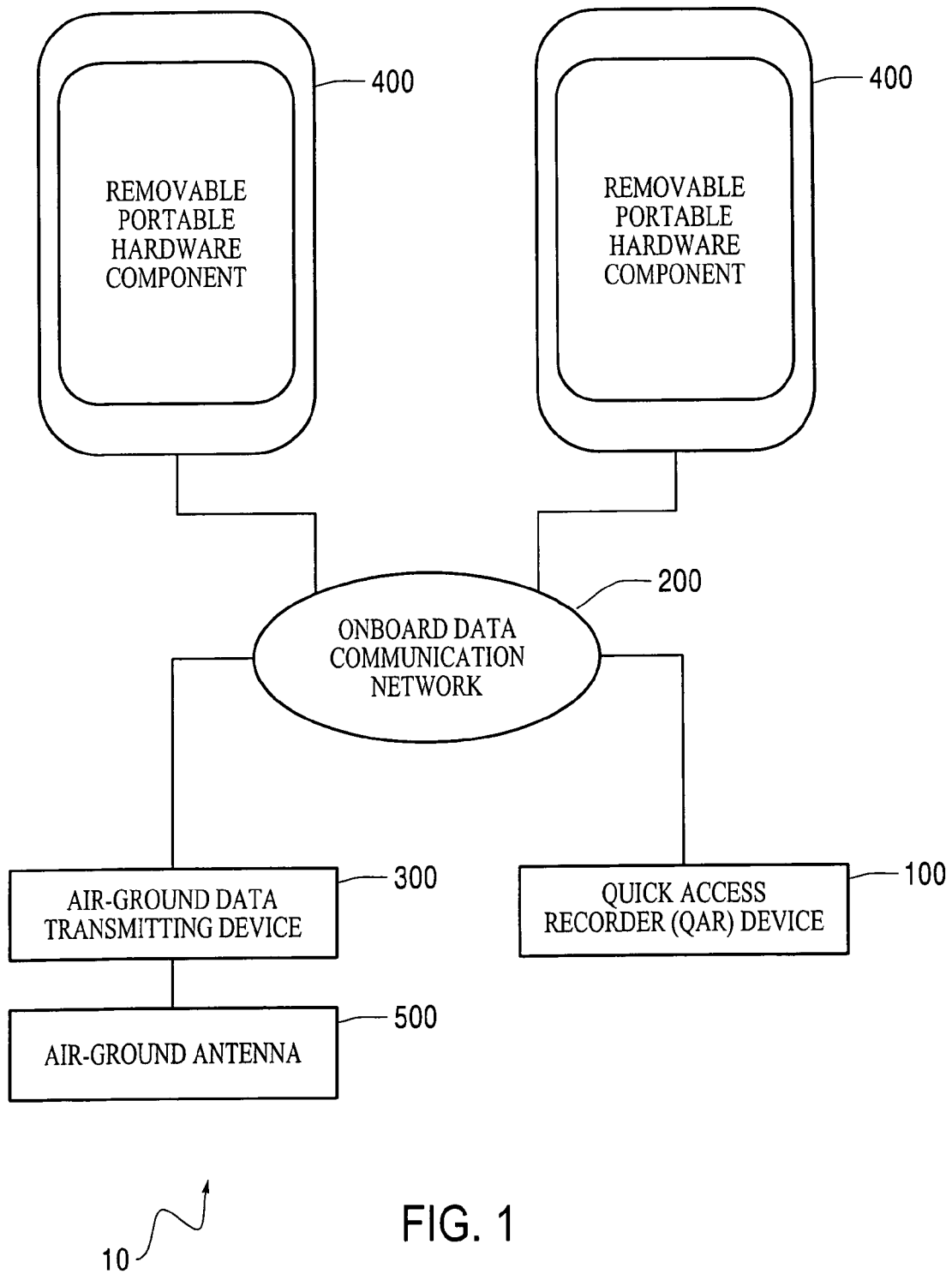
FIG. 1 is a schematic representation of a system of one exemplary embodiment for monitoring and reporting fault information according to this invention.

FIG. 1 illustrates one exemplary embodiment of a system according to this invention. The monitoring and reporting of QAR data system 10 includes a Quick Access Recorder (QAR) device 100, an onboard data communication network 200, an air-ground data transmitting device (AGDTD) 300, a plurality of removable hardware components 400, and an air-ground antenna 500.

A QAR is a mass storage device that records a large and diverse plurality of output signals from line replaceable units (LRUs), actuators, valves, sensors, and other various components of a vehicle to determine any indication of legitimate faults. In an exemplary embodiment of the systems and methods according to the invention, the QAR device 100 may be, for example, an Avionica miniQAR Mark II, that records information and transmits information, in real time, over an onboard data communication network 200 to a removable hardware component 400. It should also be appreciated that the information can be recorded on, in addition to, or as an alternative to, the QAR device 100, for example, magnetic tape storage medium, an optical storage disc, and any current or future developed memory device.

In various exemplary embodiments, the information can be requested and transmitted via direct connection, such as, but not limited to, an RS232 line or an Ethernet to the removable hardware components 400 which can be, but are not limited to, standard commercial-off-the-shelf personal computers (PCs) carried by pilots and/or other aircrew members which are used to perform various operational functions on and off the flight deck.

The onboard data communication network 200 enables onboard devices to exchange different types of information, including, but not limited to, information stored in the QAR device 100. The removable hardware component 400 uses information fusion and onboard reasoning processing for diagnosis, prognosis, fault isolation, and identification of component or components responsible for the faulty conditions or alert conditions. In this manner, flight crews and/or maintenance personnel are cued to ensure that parts are available for repair or replacement, or that the vehicle (e.g., aircraft) is taken out of service, if required. The onboard data communication network 200 may include, but is not limited to, an ARINC 429 data bus, a MIL STD 1553 (IEEE 1553) data bus, or an Ethernet network. Future embodiments may include the capability to utilize wireless communications such as, but not limited to, Bluetooth, 802.11 or other communications technologies as they become available.

It should be appreciated that the onboard communication network 200 may exchange other information within a vehicle. For example, on aircraft, the exchanged information can include, but is not limited to, physical sensors, flight profile information, flight data recorder data, and other secondary indications of system behavior. The information is sent to a reasoner (not shown), typically a software application hosted in the EFB, which fuses the collected information to establish the state of aircraft and condition of the aircraft.

The AGDTD 300 transmits and receives information to and from a vehicle. The information is exchanged as a binary or character-oriented message. The AGDTD 300 uses various wireless technologies, such as, but not limited to, ACARS, GPRS, VDLM2, CDMA, or Iridium as the communication medium. The system is also capable of utilizing wireless technologies such as, but not limited to, 802.11 and Ethernet when the aircraft is on the ground in proximity of ground Ethernet access. An exemplary embodiment according to this invention may include, as the AGDTD 300, a FlyTimer ACARS Communication Unit.

It should be appreciated that the AGDTD 300 can transmit the information in real time to the flight crews, and/or maintenance crew on the ground, as well as to other automated systems such as an airline host computer which may have the capability to automatically process certain data. It should also be appreciated that the AGDTD 300 can operate independently of the main vehicle power supply or may be connected to the main vehicle power supply.

The AGDTD 300 is connected to an air-ground antenna 500 to transmit, in real time, the QAR information to maintenance personnel on the ground using various communications media as appropriate. For example, in flight, the standard ACARS VHF antenna or Iridium antenna may be used. On the ground, if 802.11 connection is available, an 802.11 antenna installed on the aircraft or as part of the EFB installation may be used.

The removable hardware component 400 is a device that receives and collects the information of the QAR device 100, and is capable of hosting a suite of applications. The removable hardware component 400 may be an Electronic Flight Bag (EFB) which is typically a standard tablet PC that meets FAA criteria as a Class 2 device. The EFB is portable and used as a host computer for various functions on a flight deck. The EFB is a small electronic information management device for use by flight crew in performing flight-related tasks. These devices aid pilots and aircraft operators in conducting flight more efficiently and safely. EFBs serve as a repository for electronic documents, such as checklists, operating manuals, and navigation publications. EFBs also serve as multi-function devices that can support an array of applications beyond those of a traditional flight bag, including, but not limited to, cabin surveillance, surface moving map display, electronic messaging, and display of live weather feeds. Further, EFBs may support unlimited expansion to other applications that normally execute on a standard PC, such as, but not limited to, crew scheduling, electronic log books, weight and balance calculators, and performance applications.

In various exemplary embodiments, the EFB hosts a QAR Manager (QARMAN) application. A QAR Manager is just a part of a program such as ARINC's eFlightDeck program that uses the EFB and communication technologies to manage all applications on the EFB. The eFlightDeck program consists of a suite of applications that not only eliminate time-consuming paper processes, but take the concept of an integrated pilot operational environment (i.e., every-day cockpit tasks) to the next level more easily and quickly, resulting in cost savings for the airlines.

The EFB programs are designed to operate software like ARINC's QARMAN and EFB Video Viewer, and to be compatible with other commercially available applications, such as, for example, FlyTimer ACARS CDU, Jeppessen™ JeppView™ and AMT FlightMan™.

Figure 2:
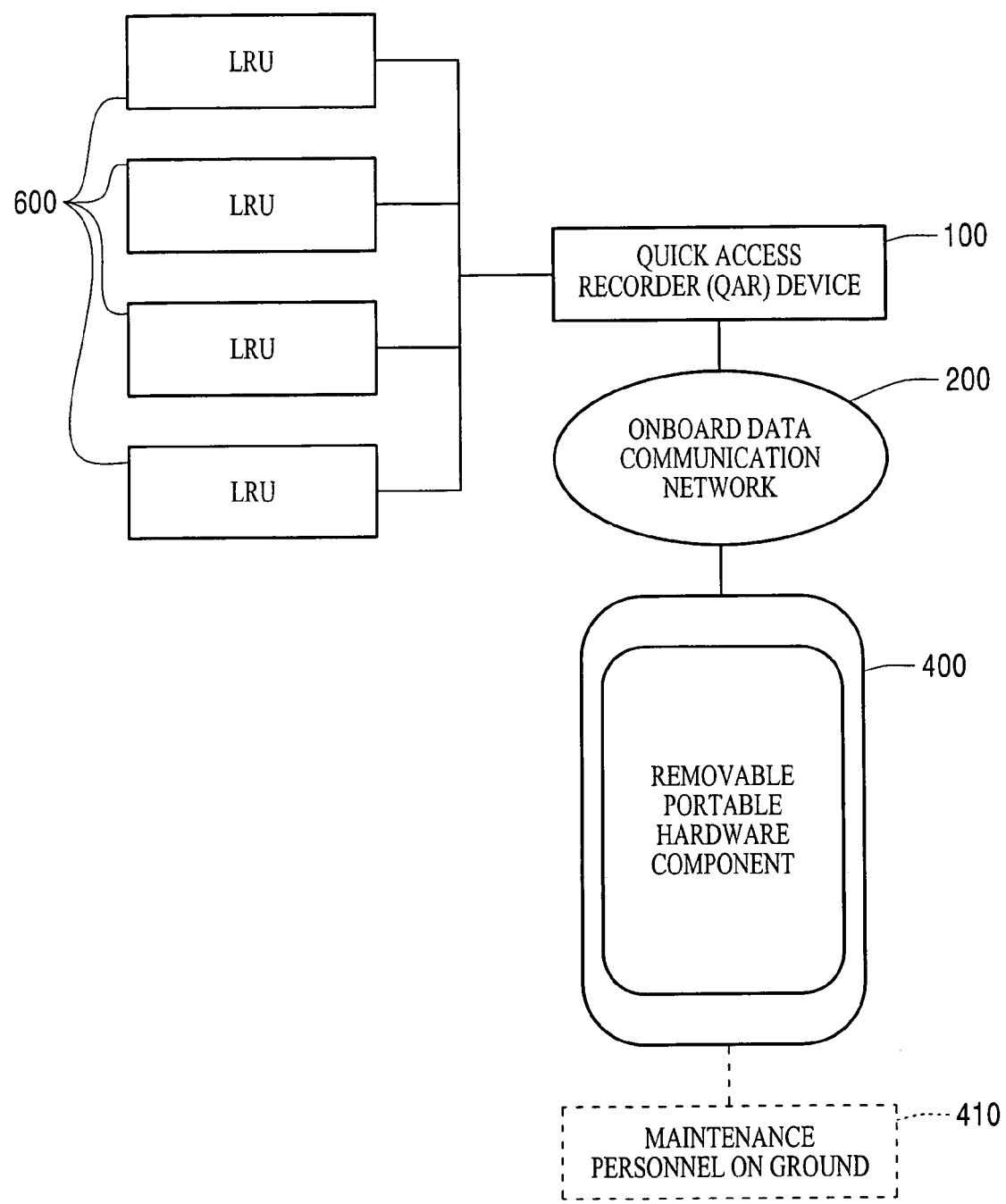
FIG. 2 is a schematic representation of a system of one exemplary embodiment for monitoring and reporting the LRUs according to this invention.

FIG. 2 is a schematic representation an exemplary embodiment according to the invention of a system that monitors and reports the status of multiple line replaceable units (LRUs). As shown in FIG. 2, the system includes multiple LRUs 600, a QAR device 100, an onboard data communication network 200, and a removable portable hardware component 400.

The LRUs 600 monitor and/or control one or more devices such as, but not limited to, actuators, valves, motors, and pumps that are associated with a particular component or assembly of a vehicle, such as, for example, an aircraft. Reference is made, in this regard, to the list of the systems and components of a military aircraft which are associated with LRUs that is set forth in the aforementioned U.S. Pat. No. 6,115,656. The LRUs 600 are interfaced with a QAR device 100 to record and store the information and determine any fault or alert conditions. The information is communicated to the removable portable hardware component 400 via an onboard data communication network 200. The removable portable hardware component 400 stores LRU fault data generated during flight. The data may be obtained from the LRUs continuously in flight or may be gathered at the end of each flight.

In various exemplary embodiments, the information is communicated to maintenance personnel 410 on the ground, in real time, and one or more of the LRUs 600 can be removed from the aircraft for further diagnostic testing when the aircraft lands.

In various exemplary embodiments, recorded LRU fault data is stored in an Electronic Flight as an example of the removable portable hardware component 400.

Figure 3:
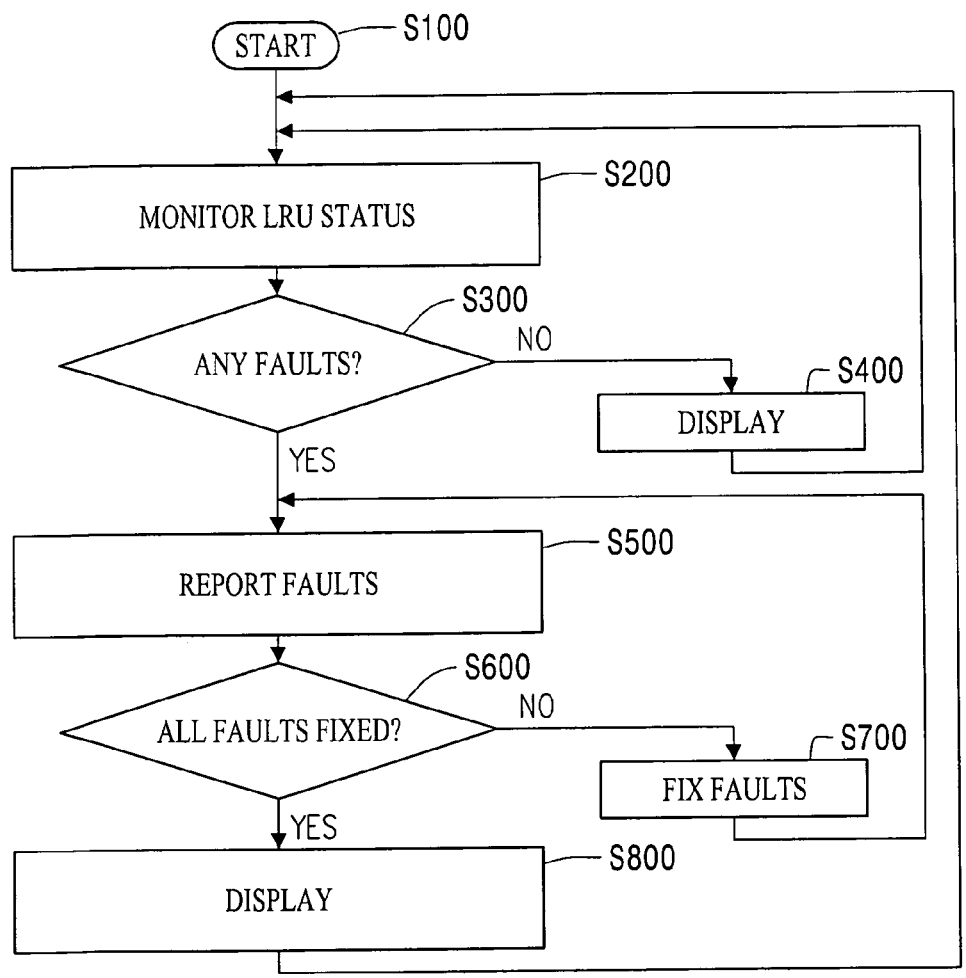
FIG. 3 is a flowchart illustrating one exemplary monitoring and reporting process according to this invention.

FIG. 3 is a flowchart of an exemplary monitoring and reporting method according to this invention. Operation of the method begins at step S100 and proceeds to step S200 where LRUs are monitored for faults.

Operation of the method continues to step S300 where a determination is made of whether any, and how many, LRU fault conditions exist. In step S300, if no faults are detected, operation of the method proceeds to step S400 where no-fault results may be displayed, and then operation of the returns to step S200 to continue monitoring LRU status.

In step S300, if any LRU faults are detected, operation of the method proceeds to step S500.

In step S500, detected faults may be displayed along with what LRUs the faults may be associated with. Operation of the method proceeds to step S600.

In step S600, a determination is made as to whether detected faults have been fixed. If a determination is made in step S600 that all of the detected faults have been fixed, operation of the method proceeds to step S800.

In step S800, corrected fault status may be displayed and the operation of the method then returns to step S200 to continue to monitor for LRU faults.

If a determination is made in step S600 that all of the detected faults have not been fixed, operation of the method proceeds to step S700.

In step S700, an attempt is made to fix some or all of the faults, and operation of the method returns to step S500 to continue to report LRU fault status.

From the displays in steps S400 and S800, flight crew or maintenance personnel are able to determine whether or not a fault indication recorded, for example during flight, has occurred and whether or not it has been fixed.

It should be appreciated that failures of LRUs or components can be reported to maintenance personnel on the ground for further diagnostics.

It should also be appreciated that recorded fault information can be reported to flight crew and/or maintenance personnel in real time thus allowing real-time determination of the nature and effect of specific faults, and providing enough information to either troubleshoot the fault or ensure corrective action is accomplished at the appropriate time (e.g., next landing or later).

Figure 4:
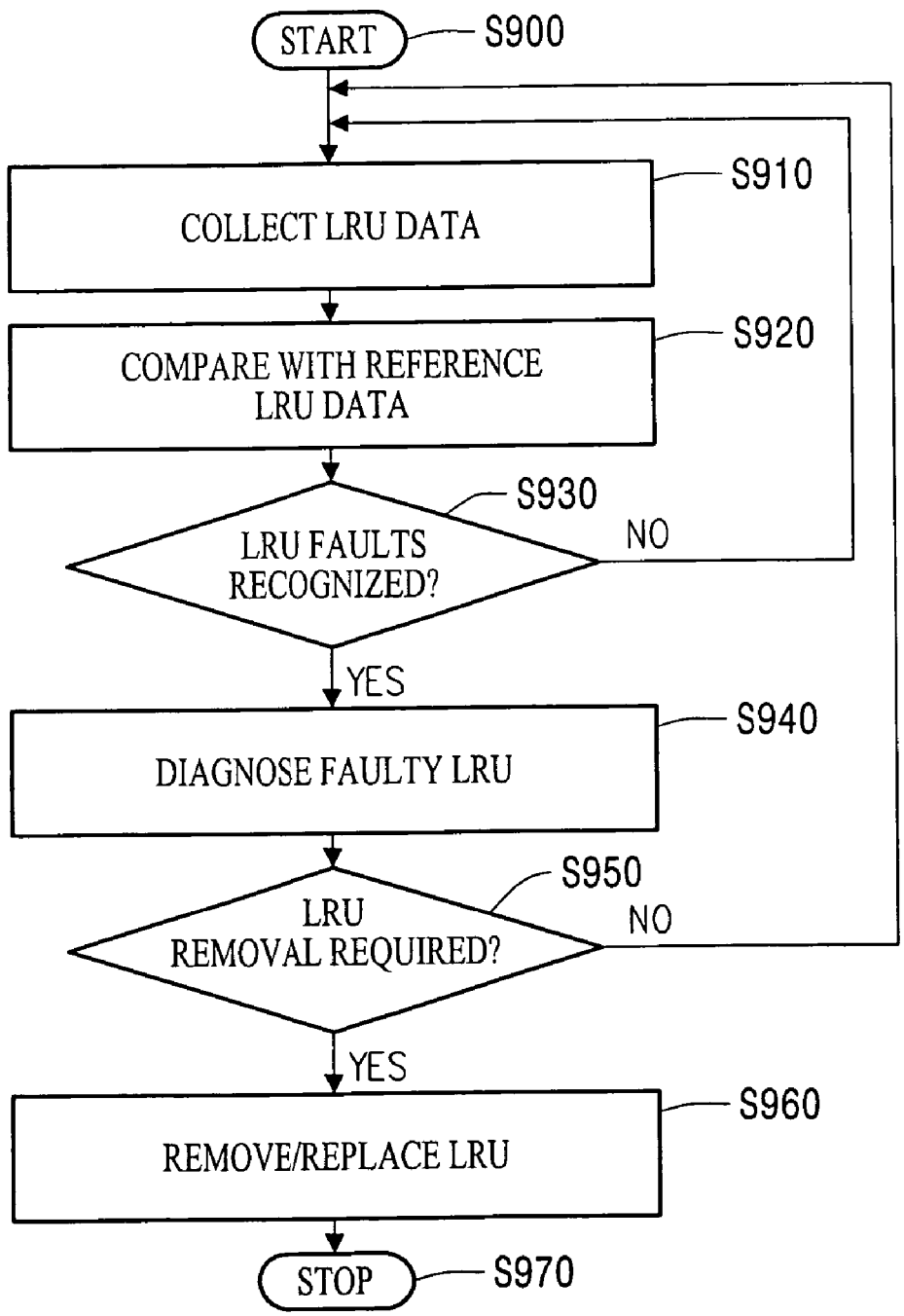
FIG. 4 is a flowchart illustrating another exemplary monitoring method according to this invention.

FIG. 4 is a flowchart illustrating an exemplary embodiment of a method of testing the system shown in FIG. 2. Operation of the method commences in step S900 and proceeds to step S910 where LRU condition data is collected. It should be appreciated that the collection of LRU condition data can be in random order or in a prioritized order. In prioritized order, the LRU condition data is displayed during flight in the form of flight crew alerts. Accordingly, faults may be prioritized regardless of whether or not the crew is aware of the fault, or any action is required. Operation of the method continues to step S920.

In step S920, the system compares LRU condition data with normal or standardized/reference data, such as, for example, flight system data. The normal or standardized/reference data is data previously recorded when the LRU is operating in a normal condition, or other predetermined acceptable data. Operation of the method proceeds to step S930.

In step S930, LRU faults are recognized as the system determines whether the data in the comparison step S920 matches or is within an acceptable range with respect to the normal or standardized/reference data. If the data is acceptable, i.e., no LRU faults exist, operation of the method proceeds to step S910 and LRU monitoring continues.

In step S930, LRU faults are recognized because the system determines that the data is not acceptable, such as, for example, if the data does not match, e.g., a fault exists, operation of the method proceeds to step S940.

In step S940, a diagnosis of the LRU(s) for which the data is not acceptable is performed. It should be appreciated that the LRU(s) diagnosis(es) can be automatically performed by a computer (not shown) or manually performed by the flight crew or maintenance personnel using various diagnostic methods. If, for example, the flight crew observes the fault, then the LRU(s) may be tested/evaluated by utilizing manual test equipment with or without the benefit of maintenance manual(s). Operation of the method proceeds to step S950.

In step S950, a determination is made whether LRU removal is required. If the determination is made in step S950 that LRU removal is not required, operation of the method proceeds to step S910 where data collection continues.

If a determination is made in step S950 that LRU removal is required, operation of the method proceeds to step 960 where any faulty LRU(s) may be removed and replaced, and the removed LRU(s) may be further diagnosed and operation of the method proceeds to step S970 where operation of the method stops.

Figure 5:
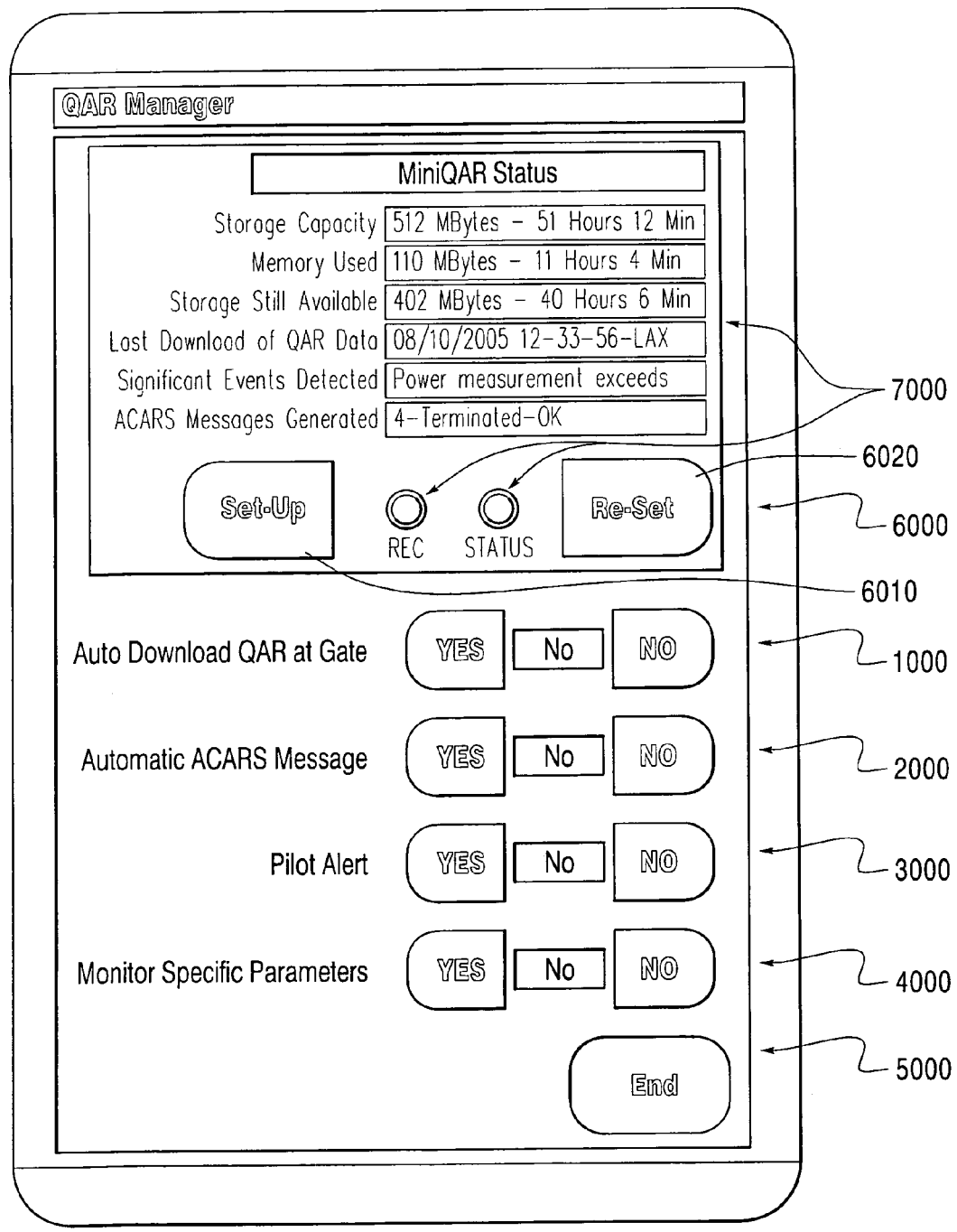
FIG. 5 is a screen image of an exemplary EFB hosted QAR Manager application that shows an exemplary embodiment for monitoring and reporting fault information according to this invention.

FIG. 5 is an exemplary embodiment of a software module of the QAR Manager for monitoring and reporting fault information in an exemplary EFB. The QAR Manager software module may be a stand-alone module that can be seamlessly integrated into an EFB environment as either a stand-alone application or integrated with other suite of software, such as, for example, ARINC eFlightDeck. As an exemplary embodiment, the software module displays a screen image of a EFB hosted QAR Manager application. The QAR Manager application includes the functions of, but not limited to, user interface (e.g., command input and message display), QAR status monitor, communication message generation and distribution, parameter management (e.g., configuration), and parameter monitor.

The exemplary embodiment illustrated in FIG. 5 includes a user interface function of the QAR Manager software module, such as, for example to Auto Download QAR at Gate 1000, to enable an Automatic ACARS Message 2000, to provide Pilot Alert 3000, and to Monitor Specific Parameters 4000.

In the Auto Download QAR at Gate 1000 function, the user (e.g., pilot) selects the yes or no buttons. When the yes button is selected by the user, the contents of the QAR system, for example, stored data, will be automatically transmitted to ground systems or personnel when an appropriate communication link is established (i.e., 802.11 wireless Ethernet connection between aircraft and system at an airport). It should be appreciated that the user interface function also provides positive indication (between buttons) of the current state of the parameter.

The Automatic ACARS Message 2000 function allows the user to enable or disable the automatic generation of ACARS messages that would be generated if specific parameters are exceeded. It should be appreciated that the user can turn off the automatic messages due to abnormal conditions such as frequency congestion due to an overwhelming number of messages.

The Pilot Alert 3000 function allows the user to instruct the system to send messages automatically, if desired. If enabled, when the QAR monitor detects a parameter that would generate an ACARS message, it would present a message on the EFB display so that the user was aware of the condition and subsequently or simultaneously send ACARS messages to ground systems or maintenance personnel.

The Monitor Specific Parameters 4000 function allows the user to enable the monitoring to begin or stop. The specific parameters to monitor are defined interactively using another function described as part of the Set-Up 6010 function.

The End 5000 function allows the user to terminate completely the QAR Manager software functionality. It should be appreciated that once depressed, the software alerts the user to confirm that the user does wish to terminate the application.

Status display area 6000 is the main configuration capability that provides a Set-Up 6010 function and Re-Set 6020 function. The Set-Up 6010 and Re-Set 6020 functions both provide a means to configure the overall QAR Manager functionality. Depressing the Set-Up 6010 function causes another dialogue window to appear which provides the user access to setting up specific watch parameters as well as initiating certain housekeeping functions that control the external QAR device, such as, for example, purging the stored content or copying the QAR content to a file on the EFB in order to continue recording should data storage space be limited. The Re-Set 6020 function provides the ability for the user to reset the QAR device to a default state. Pressing the Re-Set 6020 function causes another dialogue window to appear with more selectable options, such as, for example, to reset the QAR and load default parameters.

Within the exemplary status display area 6000 lie a plurality of fields/indicators 7000. For example, these fields/indicators 7000 may display, in real time, the actual status of the QAR monitoring system to the user, for example, but not limited to, the QAR storage capacity in bytes and in extrapolated time, how much QAR memory has been used, how much memory is still available for more storage, when the last successful QAR data download was accomplished, the last significant event that was detected, how many automatic ACARS messages were sent, a visual indicator showing that "REC" (recording) is in process, and a visual indication of QAR status (i.e., RED=fault).

While this invention has been described in conjunction with the exemplary embodiments outlined above, it is evident that many alternatives, modifications and variations will be apparent. Furthermore, although the exemplary embodiments are described for use in a variety of aircraft, it is contemplated that this invention may be used with other methods of transportation over land and sea. Accordingly, the exemplary embodiments of the invention, as set forth above, are intended to be illustrative, not limiting. Various changes may be made to the invention without departing from the spirit and scope thereof.

The invention claimed is:

1. A system for monitoring, reporting and diagnosing fault information of a vehicle on a real-time basis both within the vehicle and outside the vehicle, comprising:
   a quick access recorder that records fault information;
   a portable hardware component that is removable from the vehicle and that uses information fusion and onboard reasoning processing within the portable hardware component to provide at least one of diagnosis, prognosis, isolation or vehicle component identification associated with the recorded fault information;

an onboard data communication network that communicates the fault information between the quick access recorder and the portable hardware component; and a data transmitting device that transmits information regarding the at least one of the diagnosis, prognosis, isolation or vehicle component identification, in real time, between the portable hardware component and at least one remote receiver location.

2. The system according to claim 1, wherein the quick access recorder records the fault information from line replaceable units and the portable hardware component determines indications of legitimate faults.

3. The system according to claim 2, wherein the line replaceable units are removable from the vehicle for further fault diagnoses.

4. The system according to claim 1, wherein the portable hardware component is an Electronic Flight Bag that hosts a suite of applications for monitoring, reporting and diagnosing the fault information.

5. The system according to claim 4, wherein the suite of applications performs real-time monitoring and analysis of the fault information received from the quick access recorder.

6. The system according to claim 5, wherein the suite of applications enables display of notification messages pertaining to the monitoring and analysis of the fault information on the Electronic Flight Bag.

7. The system according to claim 5, wherein the suite of applications enables transmission from the Electronic Flight Bag, via the data transmitting device, of notification messages to at least one of maintenance personnel or a remote host computer system as the at least one receiver in another location.

8. The system according to claim 1, wherein the onboard data communication network is a data bus that enables exchange of information other than fault information.

9. The system according to claim 1, wherein the data transmitting device is an air-ground transmitting device further comprising an air-ground antenna.

10. The system according to claim 1, wherein the vehicle is an aircraft.

11. A method for monitoring, reporting and diagnosing fault information of a vehicle on a real-time basis both within the vehicle and outside the vehicle, comprising:

recording fault information on a quick access recorder;

communicating the fault information recorded on the quick access recorder to a portable hardware component, which is removable from the vehicle, through an onboard data communication network;

storing the fault information on the portable hardware component;

diagnosing the fault information with the portable hardware component using information fusion and onboard reasoning processing within the portable hardware component to provide at least one of diagnosis, prognosis, isolation or vehicle component identification associated with the recorded fault information; and transmitting information associated with the at least one of the diagnosis, prognosis, isolation or vehicle component identification, in real time, between the portable hardware component and at least one remote receiver location.

12. The method according to claim 11, further comprising displaying information associated with the at least one of the diagnosis, prognosis, isolation or vehicle component identification on a display unit of the portable hardware component.

13. The method according to claim 11, wherein transmitting further comprises employing an air-ground data transmitting device to transmit information to a maintenance personnel as the at least one receiver in another location.

14. The method according to claim 11, further comprising initiating an immediate corrective action based on the information associated with the at least one of the diagnosis, prognosis, isolation or vehicle component identification.

15. The method according to claim 13, further comprising notifying the maintenance personnel of a need for later initiating a corrective action based on the information associated with the at least one of the diagnosis, prognosis, isolation or vehicle component identification.

16. The method according to claim 11, wherein the portable hardware component is an Electronic Flight Bag, the Electronic Flight Bag hosts a suite of applications for monitoring, reporting and diagnosing the fault information.

17. The method according to claim 16, wherein the suite of applications performs real-time monitoring and analysis of the fault information received from the quick access recorder.

18. The method according to claim 13, further comprising connecting air-ground data transmitting device to at least one of an air-ground antenna or a ground communication antenna.

19. The method according to claim 11, wherein the vehicle is an aircraft.

\* \* \* \* \*